United States Patent [19]

Rosen et al.

[11] 4,055,281
[45] Oct. 25, 1977

[54] FILLING UNIT WITH AIR-OPERATED SPOOL VALVE SYSTEM

[75] Inventors: Sidney Rosen, Baltimore; Richard Nelson Bennett, Arbutus, both of Md.

[73] Assignee: National Instrument Company, Baltimore, Md.

[21] Appl. No.: 694,930

[22] Filed: June 11, 1976

[51] Int. Cl.² .................................. G01F 11/06
[52] U.S. Cl. .................................. 222/309; 222/334
[58] Field of Search .............. 222/249, 250, 440, 309, 222/333, 334; 141/141

[56] References Cited

U.S. PATENT DOCUMENTS

| 3,580,302 | 5/1971 | Riesenberg | 222/309 X |
| 3,666,147 | 5/1972 | Shiraki et al. | 222/309 |

*Primary Examiner*—Stanley H. Tollberg
*Attorney, Agent, or Firm*—Craig & Antonelli

[57] ABSTRACT

A spool-type valve system for use with a high-speed filling machine, in which a solenoid valve controlled by the main shaft of the filling machine, selectively supplies air under pressure to a respective end of a pneumatically operated piston-cylinder unit of a spool valve assembly which selectively opens and closes the pump space with respect to the reservoir for the product to be filled while simultaneously closing and opening the pump space with respect to the discharge nozzle.

31 Claims, 2 Drawing Figures

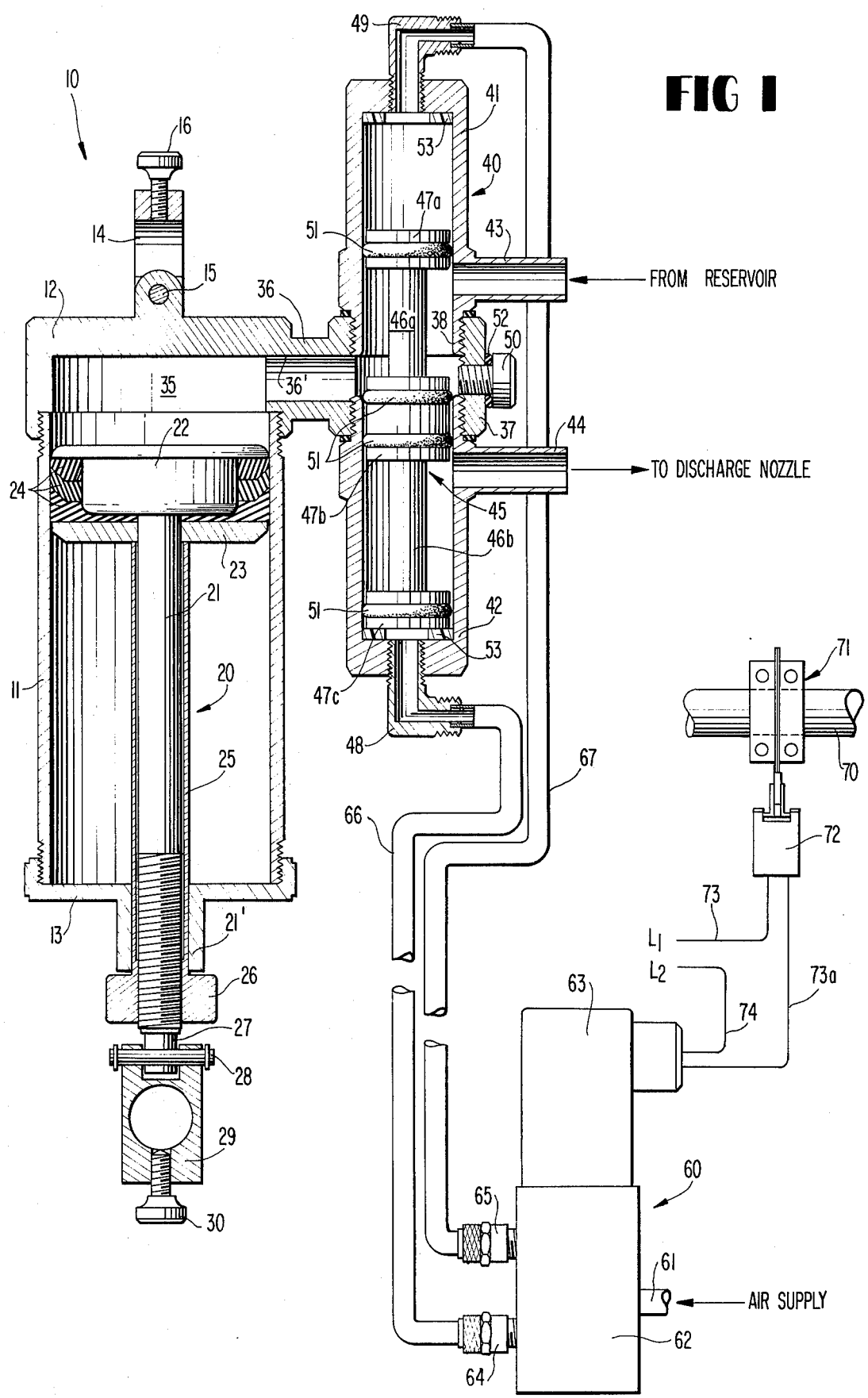

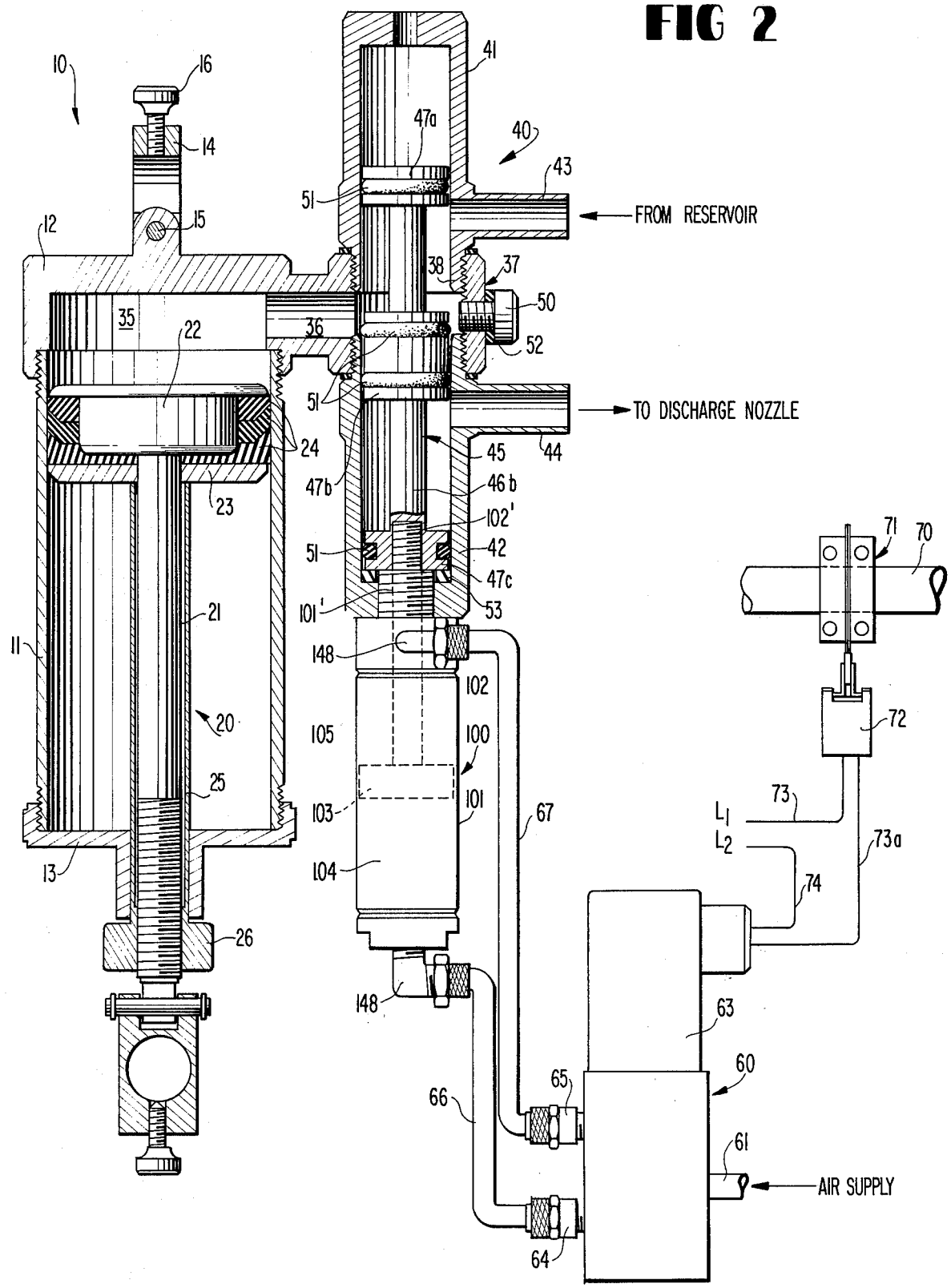

FILLING UNIT WITH AIR-OPERATED SPOOL VALVE SYSTEM

The present invention relates to a valve system, and more particularly to a spool valve system for use in high-speed filling machines for the high-speed filling of small containers, bottles, vials and ampoules.

Filling machines of this type are known in the prior art. For example, the prior U.S. Pat. No. 2,807,213 discloses a filling machine of this type in which weighted ball valves are used as inlet and discharge valves, which close off the connection to the discharge nozzle during the suction stroke of the filling pump and which close off the connection to the container or reservoir containing the product to be filled during the discharge stroke of the filling pump. While this prior art construction has proved completely satisfactory for the normal products consisting of water-thin liquids, difficulties have been encountered in the use of this machine when filling a product with suspended solids or particles such as liquids containing seeds, pulp, seasoning, etc. For example, when filling a product such as orange juice which contains pulp and seeds, charcoal slurry solutions, pizza sauce containing seeds and other semi-solids, etc., the particles lodge under the ball seats and prevent proper operation.

To obviate these drawbacks, a pinch clamp valve system has been proposed in the copending application, Ser. No. 609,541, now U.S. Pat. No. 3,971,494 filed in the U.S. Patent Office on Sept. 2, 1975, and entitled "Valve System for Filling Machines."

While the pinch clamp valve system of the aforementioned copending application has proved satisfactory for its intended purposes, it requires the use of a flexible hose with sufficient resiliency to resume its normal bore size when the pinch clamp is released. This, however, prevents the use of pressure on the intake hose of the pinch clamp valve system. A pressurized supply would cause the flexible intake hose of the pinch clamp valve to expand or balloon. Similar problems are encountered with the pinch clamp valve system of the aforementioned copending application if a viscous material were attempted to be dispensed with by the system disclosed therein. This is so as the extreme pressure exerted against the walls of the flexible discharge hose or tubing would cause the resilient hose or tubing to expand.

Finally, the repetitive pinching of the flexible hose or tubing of my prior pinch clamp valve system eventually weakens the walls thereof, thereby requiring regular replacements.

The present invention is therefore concerned with the task to eliminate the aforementioned problems encountered in the prior art constructions and to provide a valve system which is not only capable of handling products of the most varied type including products in which solids and semi-solids are present but which is also capable of handling products requiring a pressurized supply and/or the discharge of relatively viscous materials.

The underlying problems are solved according to the present invention by the use of a novel valve system which utilizes an air-operated spool valve in such a manner that during the suction stroke, the cylinder space of the filling unit is connected with the reservoir and the connection with the discharge nozzle is closed off while during the discharge stroke the connection with the reservoir is closed off and the cylinder space of the filling unit is connected with the discharge nozzle. The spool valve of the present invention is thereby controlled by air under pressure, selectively valved by a solenoid valve which is selectively energized from the main shaft or the like of the filling machine, for example, by the use of a cam operated microswitch. Seeds or other semi-solid particles that would otherwise lodge in the ball valves of the filling machine of the type disclosed in the prior U.S. Pat. No. 2,807,213 have no effect whatsoever on the operation of the filling machine utilizing the spool type valve system in accordance with the present invention. Similarly, the use of pressure on the intake hose or the discharge of relatively highly viscous material does not affect the proper operation of the device. Furthermore, the spool valve in accordance with the present invention provides a positive opening and closing, in contrast to the ball check-type valve which utilizes ball valves that open and close by gravity. Finally, the service life of the machine is greatly extended by obviating the need for regular servicing and/or replacements of worn parts.

In one particular advantageous construction of the present invention, the spool valve consists of two spool casings threadably connected to a cylindrical support section formed integral with the cylinder head of the filling unit. This permits an extremely simple construction, easy to assemble and disassemble and easy to service.

The air under pressure selectively controlled by energization of the solenoid valve is thereby supplied to the end of a respective spool casing so as to displace the spool-type piston-slide-valve member in dependence on the selective admission of the air under pressure to the one or the other spool casing.

In another embodiment of the present invention, the spool-type piston-slide-valve member is connected with the piston rod of a piston sliding within a separate air cylinder whereby the air under pressure is selectively supplied in dependence on the energization of the solenoid valve to one or the other end of the separate air cylinder. This modified construction permits complete isolation of the air supply from the product dispensed by the filling unit, as would be required with certain products.

The present invention provides a rugged valve system, requiring relatively few parts which can be easily manufactured and assembled as well as disassembled in a relatively short period of time. Furthermore, the control system is simple and reliable in operation and provides a high degree of accuracy as to the amount of liquid dispensed. Spool valves, as such, are known in the art. However, their use in high-speed filling machines of the type described above not only solves a particular problem when filling viscous products or products containing small solid particles or semi-solid particles suspended therein which are filled under relatively elevated pressure, but additionally increases the accuracy of the filling operation in a surprising manner without restriction as to the pressure in the intake hose or the viscosity of the dispensed product. Filling accuracies of about ±0.1% to about ±0.5%, depending on the product being filled, can be realized with the spool valve system in accordance with the present invention. These results are surprisingly better than those obtainable heretofore with the ball valves as disclosed in the prior U.S. Pat. No. 2,807,213 which enabled accuracies that were poorer by a factor of about 2 to 10 times and even more.

Accordingly, it is an object of the present invention to provide a valve system for high-speed filling machines which avoids by simple means the aforementioned shortcomings and drawbacks encountered in the prior art.

Another object of the present invention resides in a valve system for high-speed filling machines which enables the filling or dispensing of products of the most varied types including the filling of products containing solids or semi-solids suspended therein, without danger of malfunctioning of the valves and/or dripping by the filling nozzles.

A further object of the present invention resides in a spool valve system for high-speed filling machines which is simple in construction, reliable in operation and easy to assemble and disassemble.

Still a further object of the present invention resides in a spool-type valve structure which is sturdy, requires few, relatively simple parts that can be readily machined and permits easy servicing.

Another object of the present invention resides in a spool valve system for high-speed filling machines which significantly increases the filling accuracy of the machine yet requires no expensive metering devices that are normally prone to rapid wear, not to mention high initial costs and costly subsequent maintenance.

These and other objects, features and advantages of the present invention will become more apparent from the following description when taken in connection with the accompanying drawing which shows, for purposes of illustration only, two embodiments in accordance with the present invention and wherein:

FIG. 1 is a somewhat schematic view of a spool valve system in accordance with the present invention illustrating the filling unit and spool valve in cross section; and FIG. 2 is a somewhat schematic view of a modified spool valve system in accordance with the present invention, similar to the system of FIG. 1.

Referring now to the drawing wherein like reference numerals are used throughout the two views to designate like parts, and more particularly to FIG. 1, reference numeral 10 generally disignates a filling unit which may be of any conventional construction. In the illustrated embodiment, the filling unit 10 includes a cylinder housing 11 closed off at the top by a cylinder head 12 screwed over the upper end and at the bottom by a bottom cap 13. The upper swivel member 14 is pivotally connected with the cylinder head 12 by way of a swivel pin 15 and includes a thumb screw 16 for attachment to the corresponding part of the machine. The piston assembly generally designated by reference numeral 20 includes a piston rod 21 carrying a piston head 22 integral therewith. The piston rings 24 are held between a piston pad 23 and the piston head 22. The piston pad 23 is supported by an adjustment stem 25 surrounding the piston rod 21 which includes at the lower end an internally threaded adjusting collar 26 engaging with the externally threaded lower end of the piston rod 21. Rotation of the adjusting collar 26, for example, by inserting an adjusting pin into a hole provided in the collar for that purpose, will permit adjustment of the piston assembly from the outside of the filling unit. The swivel block 27 which is integrally formed with the piston rod 21 at the lower end thereof is pivotally connected by means of a swivel pin 28 with the lower swivel member 29 which again includes a thumb screw 30 for fastening to its corresponding machine part.

A variable pump space 35 is formed between the upper end of the piston head 22 and the cylinder head 12 and corresponding part of the cylinder housing 11. This pump space 35 increases during the suction stroke, i.e., when the piston 20 moves downwardly, as viewed in FIG. 1, and again decreases during the discharge stroke when the piston 20 again moves in the upward direction, as viewed in FIG. 1. The cylinder head 12 is formed integrally with a short cylindrical, internally threaded mounting section generally designated by reference numeral 37 which is located adjacent to the cylinder head 12 and which is provided with an internally threaded bore 38 disposed substantially coaxially to the cylinder axis of the filling unit 10. The bore 38 is in communication with the piston space 35 by way of a transverse bore 36' formed within a short pipe-like connecting portion 36 connecting the cylinder head 12 with the mounting section 37 for the spool valve assembly. The cylindrical mounting section 37 supports and forms part of the spool valve generally designated by reference numeral 40 in the assembled condition of the latter. The spool valve 40 includes an upper spool casing 41 and a lower spool casing 42 each provided with externally threaded end portions which are adapted to the screwed into the internally threaded bore 38. The upper spool casing 41 includes a short pipe connection 43 adapted to be connected with the reservoir containing the product to be filled, for example, by way of an appropriate tubing or hose, while the lower spool casing 42 includes a short pipe connection 44 to be connected with the discharge nozzle or nozzles, again, for example, by way of an appropriate tubing or hose. A spool type slide valve member generally designated by reference numeral 45 is slidably received within the cylinder housing of the spool valve assembly 40 formed by spool casings 41 and 42 and includes two slide valve piston rod sections 46a and 46b of smaller diameter and three spool type piston sections 47a, 47b and 47c which are located respectively, at the upper end, in the middle and at the lower end of the piston rod sections 46a and 46b. Male elbow members 48 and 49 are screwed into the corresponding internally threaded bores in the respective outer ends of the lower and upper spool casings 42 and 41. A thumb screw 50 is provided to close off a threaded bore coaxial with the bore 36' to enable access to the inside for purposes of servicing. Additionally, O-ring seals 51 are provided in annular grooves in the spool-type piston sections 47a, 47b and 47c to assure a proper seal between the various spaces. Similarly, a sealing ring 52 is provided to seal the inside of the spool valve against the outside at the location of the thumb screw 50.

A solenoid valve generally designated by reference numeral 60 which is of conventional construction includes a short pipe connection 61 for the air supply under pressure which is selectively valved by the valve section 62 thereof controlled by the solenoid section 63 whose solenoid is of the electromagnetic type and is adapted to be electrically energized. The valve section 62 thereby selectively valves the air under pressure either into the connecting stub 64 or connecting stub 65 connected with the respective lower and upper portion of the spool valve 40 by way of line sections 66 and 67, depending on the energization or de-energization of the solenoid 63.

The pump shaft or main shaft 70 which rotates in unison with the pump or the filling unit includes a split cam assembly generally designated by reference numeral 71 which during rotation of the shaft 70 actuates a microswitch 72 which is operable to selectively close the lines 73 and 73a to energize the solenoid valve 60 by energizing its electromagnet, when the main shaft 70 rotates through a predetermined angular range.

OPERATION

The operation of the spool valve system in accordance with the present invention is as follows.

It is assumed that the machine has stopped at the end of a discharge stroke. As the cam 71 now arrives at an angular position corresponding to the beginning of the suction stroke of the pump in the filling unit, the cam 71 opens the microswitch 72. Opening of the microswitch 72 disconnects line 73 from line 73a and thereby causes de-energization of the solenoid valve 60 so as to direct air under pressure into the pipe stub 65 and therewith by way of line 67 to the upper casing 41 of the spool valve assembly 40, whereby the spool-type piston 46a, 46b, 47a, 47b, 47c is displaced into the position illustrated in FIG. 1 of the drawing. As a result thereof, the reservoir is connected by way of the pipe connection 43 and the inside of the valve space defined between the spool-type piston sections 47a and 47b with the variable pump space 35 by way of the bore 36'. As the piston 20 moves downwardly, the product to be filled is thereby sucked into the pump space 35. After the cam 71 has rotated through about 180°, the microswitch 72 is closed again, the lines 73 and 73a are interconnected, the solenoid valve 60 is energized, and air under pressure is now selectively valved to the connecting pipe stub 64 and therewith by way of line section 66 to the lower spool casing 42, thereby causing the spool-type slide-valve-piston member 46a, 46b, 47a, 47b and 47c to be displaced in the upward direction into the opposite position from that shown in FIG. 1, in which the piston section 47a abuts against the upper end wall of the upper casing 41. As a result thereof, the intake pipe connection 43 is now closed off from the pump space 35 while the discharge pipe connection 44 is placed into communication with the pump space 35 by way of the bore 36' and the spool space delimited between the spool-type piston sections 47b and 47c. As the piston assembly 20 now carries out its discharge stroke during its upward movement, the product to be filled is discharged out of the pump space by way of the bore 36' and the discharge pipe connection 44 to the discharge nozzle or nozzles (not shown). Upon completion of the discharge operation, i.e., after the main shaft 70 has again rotated through about 180°, the microswitch 72 is again opened as the piston 20 is again about to commence its suction stroke and the solenoid valve 60 is de-energized, whence the operation as described above is repeated.

From the foregoing, it can be readily seen that all valving is performed inside the stainless steel cylinder head assembly 12, 37 and the spool casings 41 and 42 connected therewith. Since the valving action no longer depends upon a pinch clamp valve, any type of rigid, pressure hose or tubing can be used with the spool valve filling unit of the present invention, thereby eliminating the problems encountered with expanding or ballooning when the intake hose, connected to the pipe connection 43 is under pressure or when a viscous material is being filled.

Nylon pads 53 may be provided inside of the closed end of the spool casing 41 and 42 to cushion the abutment of the spool type piston section 47a and 47c during actuation by the air pressure. This will further reduce wear by parts of the spool valve 40.

FIG. 2 illustrates a modified embodiment which is intended to isolate the air supply from the product which is being dispensed by the filling unit. Only the differences between the embodiment of FIG. 2 and the embodiment of FIG. 1 will be described, similar parts of FIG. 2 being designated by corresponding reference numerals.

In the embodiment of FIG. 2 an air cylinder control unit generally designated by reference numeral 100 is threadably secured to the lower end of the lower spool casing 42, provided for that purpose with an internally threaded bore to receive a hollow threaded plug member 101' fixed to the casing 101. The piston rod 102 carrying the piston 103 is provided with an external thread at the upper, free end thereof which is threadably screwed into a complementary threaded bore provided in the lower spool-type piston section 47c. The line section 66 and 67 again made of suitable tubing or hosing are connected with the lower and upper end of the cylinder housing 101 by way of male elbow members 148.

The operation of the device of FIG. 2 is analogous to that of FIG. 1 except that now the spool type piston slide valve member 46a, 46b, 47a, 47b, 47c is indirectly actuated by way of the piston 103 and piston rod 102 connected therewith, which are controlled by the selective admission of air under pressure to the lower or upper end of the air-cylinder 101. As is quite apparent, this particular arrangement permits complete isolation of the air supply from the product being dispensed and would be of use with critical liquids such as foods, oral drugs, injectible drugs, etc.

On the other hand, the embodiment of FIG. 1 has the advantage of being more compact and would normally be used for handling miscellaneous chemicals such as solvents, molten waxes, cosmetics, etc.

Both embodiments of FIGS. 1 and 2 are characterized by simplicity in design, ease of assembly and disassembly and high accuracy and reliability in operation. Furthermore, as can be quite readily seen, a small number of parts in simple design and construction are required, which can be readily manufactured at relatively low costs. On the other hand, the spool valve filling unit of the present invention permits the use of any type of rigid pressure hose or tubing to be connected with the filling unit, thereby obviating the drawbacks of the pinch clamp valve of my copending application while retaining the significant advantages obtainable therewith.

Of course, in lieu of a spool-valve positively controlled by the pneumatic pressure medium in both directions, it is also feasible to spring-load the spool-type piston-slide-valve member in one direction and then actuate the same in only the one direction against the spring force by the use of the pneumatic pressure medium.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A valve system for a high-speed filling machine which includes a filling unit with pump means including a reciprocating metering piston defining a variable pump space and actuating means for said filling unit, said filling unit being adapted to be connected with connecting tube means to enable connection of a reservoir containing the product to be filled with discharge nozzle means, and said filling unit being operable to suck in the product to be filled during the suction stroke of the metering piston of its pump means by way of an intake section of said tube means and to discharge the product under pressure during the discharge stroke of the metering piston through the nozzle means by way of a discharge section of said tube means, characterized by spool valve means alongside said pump means including a spool-valve piston member and two connecting means valved by the spool-valve piston member for connection with said intake and discharge sections, said spool-valve means being operable to open the flow path from the connecting means for the intake section to the pump space of the pump means and interrupt the flow path from the pump space to the connecting means for the discharge section during the suction stroke of the pump means and to open the flow path from the pump space to the connecting means for the discharge section and to interrupt the flow path from the connecting means for the intake section to the pump space during the discharge stroke of the pump means, solenoid valve means adapted to be connected with its input to a source of a pneumatic medium under pressure and operatively connected with at least one output thereof to the spool-valve means so as to selectively displace the spool-valve piston member by selective feed of the pneumatic medium under pressure, an energizing circuit for said solenoid valve means including switch means, and means for closing said switch means in dependence on the angular position of said actuating means.

2. A valve system according to claim 1, characterized in that said pump means is separate from said spool valve means.

3. A valve system according to claim 2, characterized in that said pump means of the filling unit is mechanically actuated by said actuating means to reciprocate its metering piston.

4. A valve system according to claim 1, characterized in that the pump means includes a pump axis which is disposed in a plane at least approximately parallel to the axis of the spool valve means.

5. A valve system according to claim 1, characterized in that said two connecting means include a first connecting means adapted to be connected with the reservoir and a second connecting means adapted to be connected with a discharge nozzle means, the spool-valve piston member including a plurality of spool-type piston sections so spaced with respect to the first and second connecting means that in one end position of the spool-valve piston member, the first connecting means is in communication with the pump space while the second connecting means is disconnected therefrom and in the other end position of the spool-valve piston member, the second connecting means is in communication with the pump space while the first connecting means is disconnected therefrom.

6. A filling unit for a high-speed filling machine to rapidly fill small containers with a predetermined amount of a product, comprising pump cylinder means and metering pump piston means slidable within said pump cylinder means to form therewith a pump space adapted to be alternately connected with a reservoir for the product to be filled and with a discharge nozzle, characterized by a spool valve assembly connected with said cylinder means, said spool valve assembly including spool-valve cylinder means rigidly connected with and disposed alongside said pump cylinder means, spool-valve piston means slidable within said spool-valve cylinder means, connecting means adapted to connect the spool-valve cylinder means with the reservoir and with the discharge nozzle in such a manner that in one end position of the spool-valve piston means, the pump space is in communication with the connecting means for the reservoir and is closed off by the spool-valve piston means with respect to the connecting means for the discharge nozzle while in another end position of the spool-valve piston means, the pump space is in communication with the connecting means for the discharge nozzle and is closed off by the spool-valve piston means with respect to the connecting means for the reservoir, and means in said spool-valve assembly to enable control of the spool-valve piston means by a pneumatic medium under pressure for displacement of said spool-valve piston means from one to another one of said two end positions.

7. A filling unit according to claim 6, characterized in that the axis of said spool-valve cylinder means is disposed in a plane at least approximately parallel to the plane containing the axis of the pump cylinder means.

8. A filling unit according to claim 6, characterized in that the spool-valve piston means is free floating which is displaced by alternately applying air pressure to the one or other end thereof.

9. A filling unit according to claim 6, characterized in that the axis of the spool-valve piston means is disposed essentially non-intersectingly with the axis of the metering pump piston means.

10. A filling unit according to claim 6, characterized in that the pump space is connected with the interior of the spool-valve cylinder means by way of a continuously open connecting passage which is alternately connected with the one or other connecting means by the spool-valve piston means when in the one or the other end position thereof.

11. A filling unit according to claim 6, characterized in that the spool-valve piston means includes three spool-type piston sections interconnected by piston rod sections, with one spool-type piston section being located near each end of the spool-valve piston means and the third spool-type piston section being located intermediate the other two piston sections.

12. A valve system according to claim 1, characterized in that said actuating means includes a rotating shaft.

13. A valve system according to claim 1, characterized in that at least one of the intake and discharge sections of said tube means are pressure-type hoses.

14. A valve system according to claim 1, characterized in that the solenoid valve means includes two outputs operatively connected with the spool valve means to actuate the piston member thereof in opposite directions by the pneumatic medium under pressure.

15. A valve system for a high-speed filling machine which includes a filling unit with pump means and actuating means for said filling unit, said filling unit being adapted to be connected with connecting tube means to enable connection of a reservoir containing the product to be filled with discharge nozzle means, and said filling unit being operable to suck in the product to be filled during the suction stroke of its pump means by way of an intake section of said tube means and to discharge the product under pressure during the discharge stroke through the nozzle means by way of a discharge section of said tube means, characterized by spool-valve means including a spool valve piston member and two connecting means for connection with said intake and discharge sections, said spool-valve means being operable to open the flow path from the connecting means for the intake section to the pump space of the pump means and interrupt the flow path from the pump space to the connecting means for the discharge section during the suction stroke of the pump means and to open the flow path from the pump space to the connecting means for the discharge section and to interrupt the flow path from the connecting means for the intake section to the pump space during the discharge stroke of the pump means, solenoid valve means adapted to be connected with its input to a source of pneumatic medium under pressure and operatively connected with at least one output thereof to the spool-valve means so as to selectively displace the spool-valve piston member by selective feed of the medium under pressure, an energizing circuit for said solenoid valve means including switch means, and means for closing said switch means in dependence on the angular position of said actuating means, the solenoid valve means including two outputs operatively connected with the spool-valve means to actuate the piston member thereof in opposite directions by the pneumatic medium under pressure, and the spool-valve means including two oppositely disposed substantial coaxial spool casing means, said two connecting means including a first connecting means adapted to be connected with the reservoir and a second connecting means adapted to be connected with the discharge nozzle means, the spool-valve piston member including spool-type piston sections so spaced with respect to the first and second connecting means that in one end position of the spool-valve piston member, the first connecting means is in communication with the pump space while the second connecting means is disconnected therefrom and in the other end position of the spool-valve piston member, the second connecting means is in communication with the pump space while the first connecting means is disconnected therefrom.

16. A valve system according to claim 15, characterized in that the spool-valve piston member includes three spool-type piston sections, one spool-type piston section at each end of the piston member and one spool-type piston section intermediate the two end spool-type piston sections thereof.

17. A valve system according to claim 16, characterized in that a third connecting means is provided in the spool valve means connecting the inside of the spool valve means with the pump space of the piston means, said third connecting means being located intermediate the first and second connecting means and being effectively valved by the spool type piston section located intermediate the two end spool-type piston sections thereof.

18. A valve system according to claim 17, characterized in that the solenoid valve means includes two outputs to be selectively connected with the input of the solenoid valve means, one output being operatively connected with one end of the spool valve means and the other with the other end of the spool valve means so as to displace the spool-valve piston member inside the spool valve means in dependence on the admission of air under pressure to the one or other end of the spool valve means.

19. A valve system according to claim 17, characterized by an air cylinder means including a piston means operatively connected with the spool valve piston member, the solenoid valve means including two outputs to be selectively connected with the input thereof, and means connecting the two outputs of the solenoid valve means with opposite end portions of the air-cylinder means so as to displace the piston means slidable within the air-cylinder means in dependence on the selective supply of air under pressure to the respective side of the cylinder means and therewith to simultaneously displace the spool valve piston member in the spool valve means.

20. A valve system according to claim 1, characterized in that said spool valve means includes a cylindrical mounting section provided with an internal threaded bore, two spool casing means threadably connected to the internally threaded bore, said mounting section being formed integrally with a part of the filling unit.

21. A valve system according to claim 20, characterized in that the filling unit includes a pump cylinder means and a pump cylinder head means, said cylinder head means being formed in one piece with said mounting section.

22. A valve system for a high-speed filling machine which includes a filling unit with pump means and actuating means for said filling unit, said filling unit being adapted to be connected with connecting tube means to enable connection of a reservoir containing the product to be filled with discharge nozzle means, and said filling unit being operable to suck in the product to be filled during the suction stroke of its pump means by way of an intake section of said tube means and to discharge the product under pressure during the discharge stroke through the nozzle means by way of a discharge section of said tube means, characterized by spool-valve means including a spool-valve piston member and two connecting means for connection with said intake and discharge sections, said spool-valve means being operable to open the flow path from the connecting means for the intake section to the pump space of the pump means and interrupt the flow path from the pump space to the connecting means for the discharge section during the suction stroke of the pump means and to open the flow path from the pump space to the connecting means for the discharge section and to interrupt the flow path from the connecting means for the intake section to the pump space during the discharge stroke of the pump means, solenoid valve means adapted to be connected with its input to a source of pneumatic medium under pressure and operatively connected with at least one output thereof to the spool-valve means so as to selectively displace the spool-valve piston member by selective feed of the penumatic medium under pressure, an energizing circuit for said solenoid valve means including switch means, and means for closing said switch means in dependence on the angular position of said actuating means, said spool-valve means including a cylindrical mounting section provided with an internal threaded bore, two spool casing means threadably connected to the internally threaded bore, said mounting section being formed integrally with a part of the filling unit, the filling unit including a pump cylinder means and a pump cylinder head means, said cylinder head means being formed in one piece with said mounting section, and the spool-valve means including two oppositely disposed substantially coaxial spool casing means, said two connecting means including a first connecting means adapted to be connected with the reservoir and a second connecting means adapted to be connected with the discharge nozzle means, the spool-valve piston member including spool-type piston sections so spaced with respect to the first and second connecting means that in one end position of the spool-valve piston member, the first connecting means is in communication with the pump space while the second connecting means is disconnected therefrom and in the other end position of the spool-valve piston member, the second connecting means is in communication with the pump space while the first connecting means is disconnected therefrom.

23. A valve system according to claim 22, characterized in that the spool-valve piston member includes three spool-type piston sections, one spool-type piston section at each end of the piston member and one spool-type piston section intermediate the two end spool-type piston sections thereof.

24. A valve system according to claim 23, characterized in that a third connecting means is provided in the spool valve means connecting the inside of the spool valve means with the pump space of the piston means, said third connecting means being located intermediate the first and second connecting means and being effectively valved by the spool-type piston section located intermediate the two end spool-type piston sections thereof.

25. A valve system according to claim 24, characterized in that the solenoid valve means includes two outputs to be selectively connected with the input of the solenoid valve means, one output being operatively connected with one end of the spool valve means and the other with the other end of the spool valve means so as to displace the spool-valve piston member inside the spool valve means in dependence on the admission of air under pressure to the one or other end of the spool valve means.

26. A valve system according to claim 24, characterized by an air cylinder means including a piston means operatively connected with the spool-valve piston member, the solenoid valve means including two outputs to be selectively connected with the input thereof, and means connecting the two outputs of the solenoid valve means with opposite end portions of the air-cylinder means so as to displace the piston means slidable within the air-cylinder means in dependence on the selective supply of air under pressure to the respective side of the cylinder means and therewith to simultaneously displace the spool-valve piston member in the spool valve means.

27. A unit according to claim 6, characterized in that said spool-valve cylinder means includes a cylinder section in one piece with a part of the pump cylinder means.

28. A unit according to claim 27, characterized in that said part of the pump cylinder means is a cylinder end member and in that said cylinder section is in one piece with said cylinder end member.

29. A unit according to claim 28, characterized in that the spool valve cylinder means includes at least one spool casing means threadably connected with the cylinder section.

30. A unit according to claim 28, characterized in that the spool valve cylinder means includes two oppositely disposed coaxial spool casing means threadably secured to said cylinder section.

31. A filling unit for a high-speed filling machine to rapidly fill small containers with a predetermined amount of a product, comprising pump cylinder means and pump piston means slidable within said pump cylinder means to form therewith a pump space adapted to be alternately connected with a reservoir for the product to be filled and with a discharge nozzle, characterized by a spool valve assembly connected with said cylinder means, said spool-valve assembly including spool-valve cylinder means rigidly connected with said pump cylinder means, spool-valve piston means slidable within said spool valve cylinder means, connecting means adapted to connect the spool-valve cylinder means with a reservoir and with the discharge nozzle in such a manner that in one end position of the spool-valve piston means, the pump space is in communication with the connecting means for the reservoir and is closed off with respect to the connecting means by the discharge nozzle while in another end position of the spool-valve piston means the pump space is in communication with the connecting means for the discharge nozzle and is closed off with respect to the connecting means for the reservoir, and means in said spool-valve assembly to enable control of the spool-valve piston means by a pneumatic medium under pressure for displacement of said spool-valve piston means from one to another one of said two end positions, said spool-valve cylinder means including a cylinder section in one piece with a part of the pump cylinder means, said part of the pump cylinder means being a cylinder end member and said cylinder section being in one piece with said cylinder end member, the spool-valve cylinder means including two oppositely disposed coaxial spool casing means threadably secured to said cylinder section, and the spool valve piston means including three spool-type piston sections interconnected by piston rod sections, with one spool-type piston section being located at each end of the spool-valve piston means and the third spool-type piston section being located intermediate the other two piston sections.

* * * * *